United States Patent
Lin et al.

(10) Patent No.: US 6,913,237 B2
(45) Date of Patent: Jul. 5, 2005

(54) APPARATUS FOR MULTI-AXIS ADJUSTMENT

(75) Inventors: Wei-Szu Lin, Hsin-Chu (TW);
Shih-Hsuan Kuo, Hsin-Chu (TW);
Chi-Chui Yun, Hsin-Chu (TW)

(73) Assignee: Young Optics Inc., Hsin-Chu (TW)

( * ) Notice: Subject to any disclaimer, the term of this patent is extended or adjusted under 35 U.S.C. 154(b) by 0 days.

(21) Appl. No.: 10/709,709

(22) Filed: May 24, 2004

(65) Prior Publication Data

US 2005/0001134 A1 Jan. 6, 2005

(51) Int. Cl.[7] ............................................... F16M 13/00
(52) U.S. Cl. ........................ 248/424; 248/637; 248/676
(58) Field of Search ................................ 248/424, 425, 248/676, 678, 128, 130, 131, 138, 278.1, 279.1; 74/22 A, 29; 353/119, 77, 31; 310/80, 83

(56) References Cited

U.S. PATENT DOCUMENTS

| 4,711,537 | A | * | 12/1987 | Schindl et al. ............... 359/393 |
| 6,729,590 | B2 | * | 5/2004 | Gabriel ..................... 248/188.2 |
| 6,740,998 | B2 | * | 5/2004 | Roy ............................. 310/80 |
| 2003/0137848 | A1 | * | 7/2003 | Chang et al. ............... 362/418 |
| 2003/0159670 | A1 | * | 8/2003 | Simpson et al. .......... 123/90.17 |
| 2004/0119952 | A1 | * | 6/2004 | Chen .......................... 353/119 |

FOREIGN PATENT DOCUMENTS

DE 019547168 A1 * 2/2005

* cited by examiner

*Primary Examiner*—Ramon O Ramirez
(74) *Attorney, Agent, or Firm*—Winston Hsu

(57) ABSTRACT

A multi-axis adjusting apparatus includes a base seat, and an adjusting seat, a sliding seat and a rotating seat installed in a sequence on the base seat. A plurality of worm and worm gears are used to control the adjusting seat, and guiding slots and guiding pillars are used to cooperatively guide the sliding seat and the rotating seat. Besides, adjusting elements for controlling adjustments are screwed at one side of the seats. Whereby, an optical engine is driven to process multi-dimensional linear and rotating movements.

8 Claims, 5 Drawing Sheets

US 6,913,237 B2

APPARATUS FOR MULTI-AXIS ADJUSTMENT

BACKGROUND OF INVENTION

1. Field of the Invention

The present invention relates to an adjusting apparatus, and more particularly, to an apparatus for multi-axially adjusting a position of an optical engine.

2. Description of the Prior Art

Please refer to FIG. 1. An elevating bolt 111 is installed at the center of the lower surface of an elevating seat 11 in a conventional optical engine adjusting apparatus 10 to allow the elevating seat 11 to move up and down by rotating it. A first sliding seat 12 and a second sliding seat 13 are further stacked one by one at the center of the upper surface of the elevating seat 11, and projecting strips 121 and 131 disposed respectively at each circumference of the sliding seats 12 and 13 are used to restrain the sliding seats to move along directions from front to rear and from left to right. Moreover, a first adjusting bolt 122 is installed at the front side of the first sliding seat 12 to adjust the first sliding seat 12 to move from front to rear or vice versa and a second adjusting bolt 132 is installed at the right end of the second sliding seat 13 to adjust the second sliding seat 13 to move from left to right or vice versa. Finally, a rotating seat 14 is installed at the center of the upper surface of the second sliding seat 13 and a rotating axis 141 is then installed at the center of the rotating seat 14 so that the rotating seat 14 can be rotated freely around the second sliding seat 13 relatively. Besides, a rotation adjusting bolt 142 is installed at one side of the rotating seat 14 to control the rotation of the rotating seat 14 so as to attain the adjustments front and rear, up and down, left and right and with a rotating angle after an optical engine 1 is loaded on the adjusting apparatus.

Although adopting a layers-stacking way in the adjusting apparatus mentioned above can do an axial adjustment, but the thickness and the volume of the system are also increased. Moreover, because the adjusting bolt at each axial direction is spread at every direction, it is unfavorable for processing an adjustment work in a limited space such as the inside part of the system; this will cause an adjustment time to be increased.

SUMMARY OF INVENTION

One object of the present invention is to provide an apparatus for a multi-axis adjustment, using worm and worm gear sets to process axial adjustments and to reduce the volume of an apparatus.

Another object of the present invention is to provide an apparatus for a multi-axis adjustment, gathering up adjustment positions to enhance adjustment convenience by installing adjusting rods and adjusting elements at proper locations.

Still another object of the present invention is to provide an apparatus for a multi-axis adjustment, enhancing the stabilization of the apparatus by means of the control characteristic of worm and worm gear sets.

Still another object of the present invention is to provide an apparatus for a multi-axis adjustment, capable of doing multi-dimensional linear and rotating movements so as to increase adjustable axial directions.

For attaining the objects mentioned above, an apparatus for a multi-axis adjustment according to the present invention comprises a base seat, and adjusting seats installed sequentially on the base seat, a sliding seat and a rotating seat, in which a plurality of worm and worm gear sets are used to control the sliding seat and the rotating seat, guiding slots and guiding pillars are operated in co-ordination to guide the sliding seat and the rotating seat, and adjusting elements are screwed at one side of the seats to control them so as to drive an optical engine to do multi-dimensional linear and rotating movements.

BRIEF DESCRIPTION OF DRAWINGS

The present invention can be more fully understood by reference to the following description and accompanying drawings, in which.

DETAILED DESCRIPTION

Figure 1:
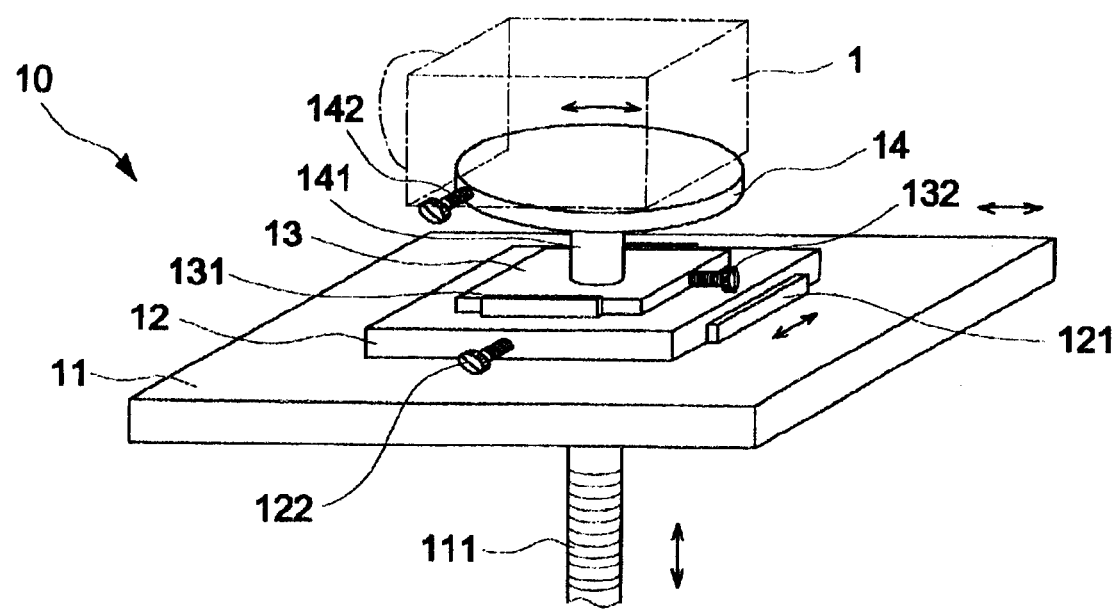
FIG. 1 is a schematic view, showing an adjusting apparatus of the prior art.
Figure 2:
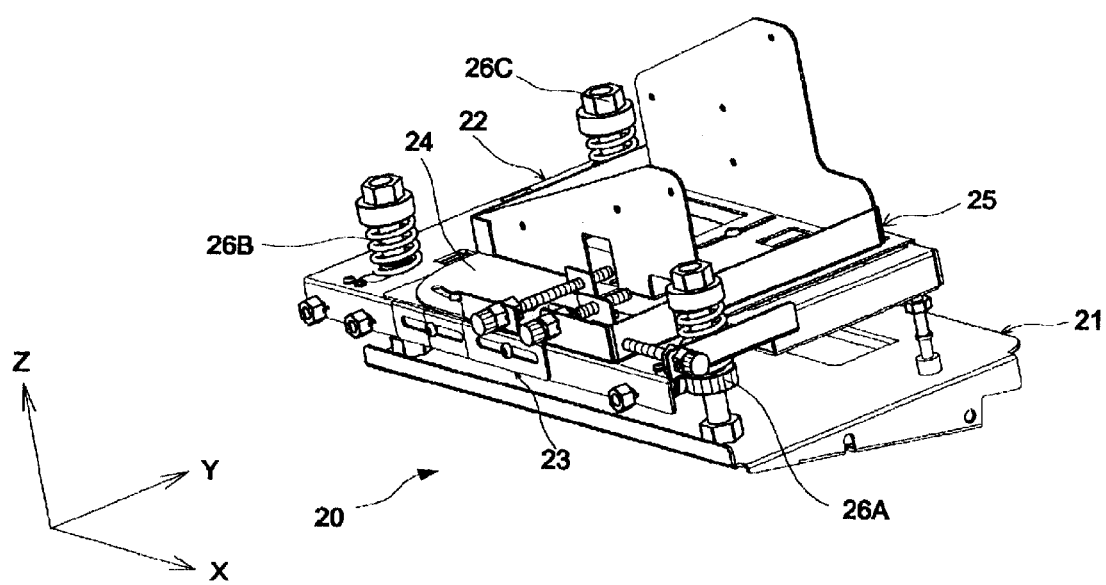
FIG. 2 is a perspective view, showing an apparatus for a multi-axis adjustment according to the present invention.

Please refer to FIG. 2. A multi-axis adjustable apparatus 20 according to the present invention is used for being installed in a projection system (not shown in the figure) and for an optical engine to be loaded thereon so that the position of the optical engine can be adjusted thereby. The multi-axis adjustable apparatus 20 comprises a base seat 21, adjusting seat 22, first sliding seat 23, rotating seat 24 and second sliding seat 25.

Figure 3:
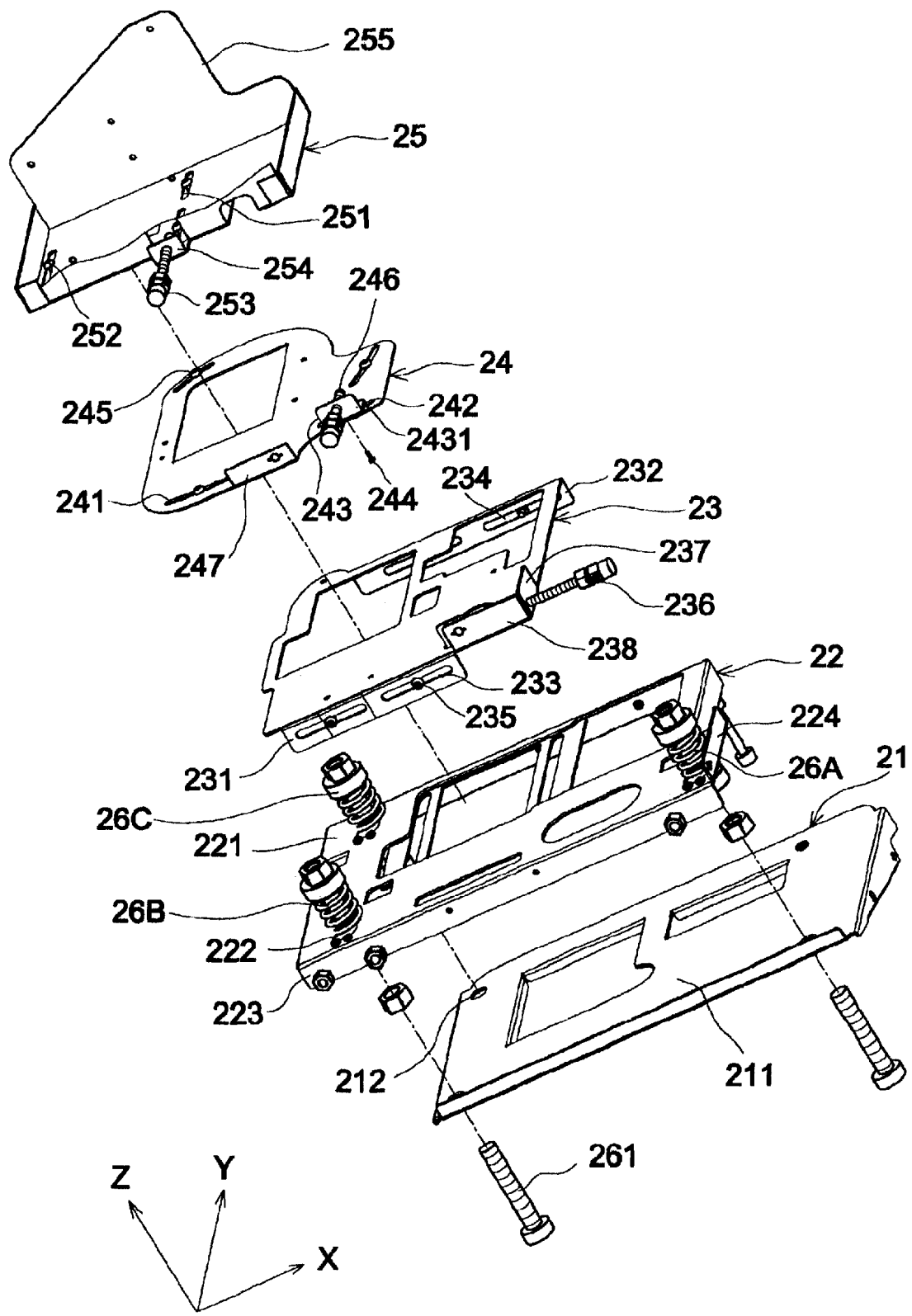
FIG. 3 is an explosive view, showing an apparatus for a multi-axis adjustment according to the present invention.

Please refer to FIG. 3, the base seat 21 has a upper surface 211 and a plurality of through holes 212 are opened therein. The adjusting seat 22 is installed at the upper side of the base seat 21, a plurality of adjusting holes 222 are opened at a upper surface 221 of the adjusting seat 22 and a side plate 223 is projected perpendicularly downward at the front end of the adjusting seat 22. A plurality of worm and worm gear sets are installed at a space between the base seat 21 and the adjusting seat 22 depending on a space structure and axial direction requirement. Worm and worm gear sets 26A, 26B and 26C are respectively installed at the front right side, front left side and rear left side of the space in a preferred embodiment according to the present invention.

Figure 4:
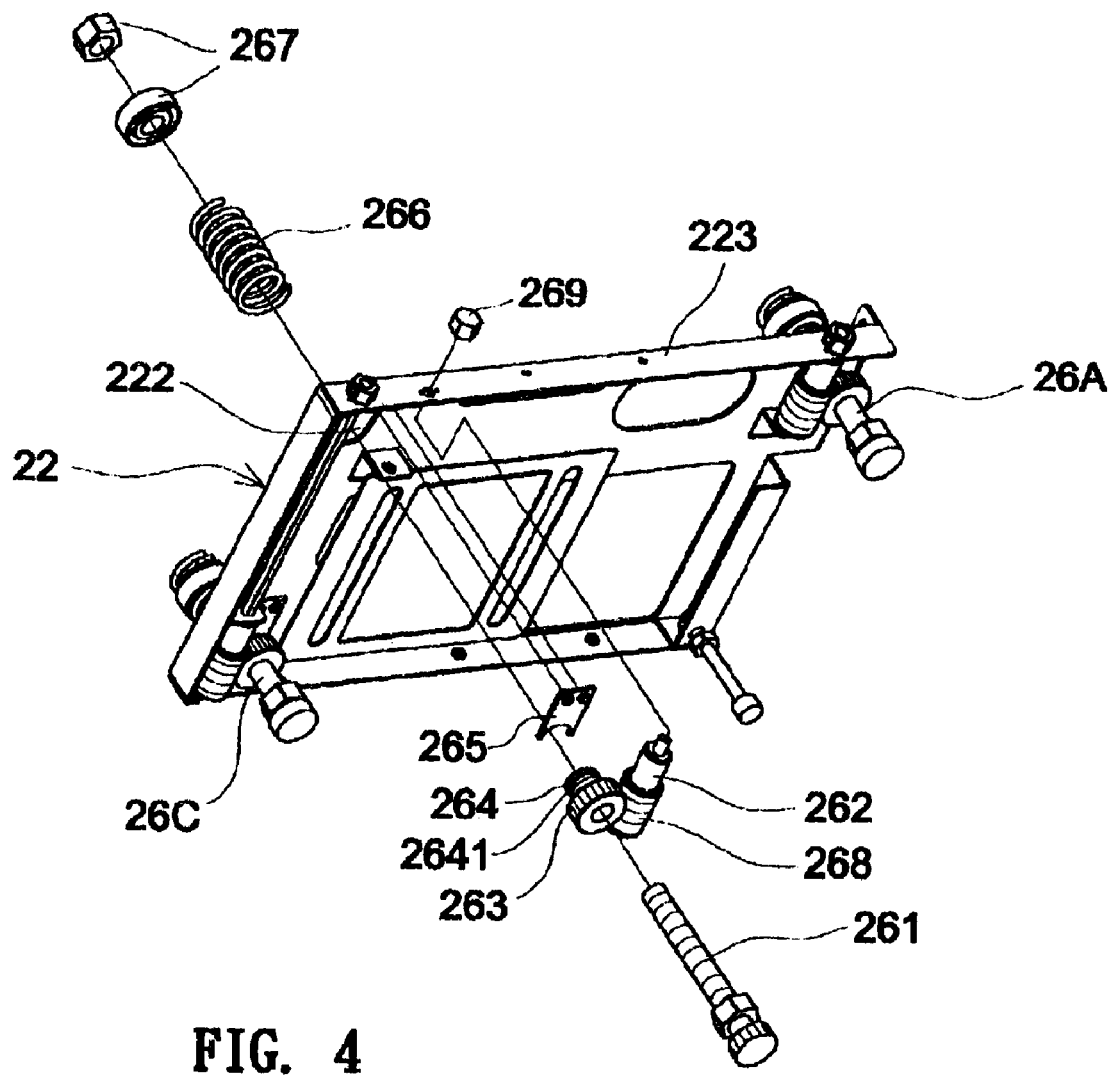
FIG. 4 is an explosive view, showing a worm and worm gear set of an apparatus for a multi-axial adjustment according to the present invention.
Figure 5:
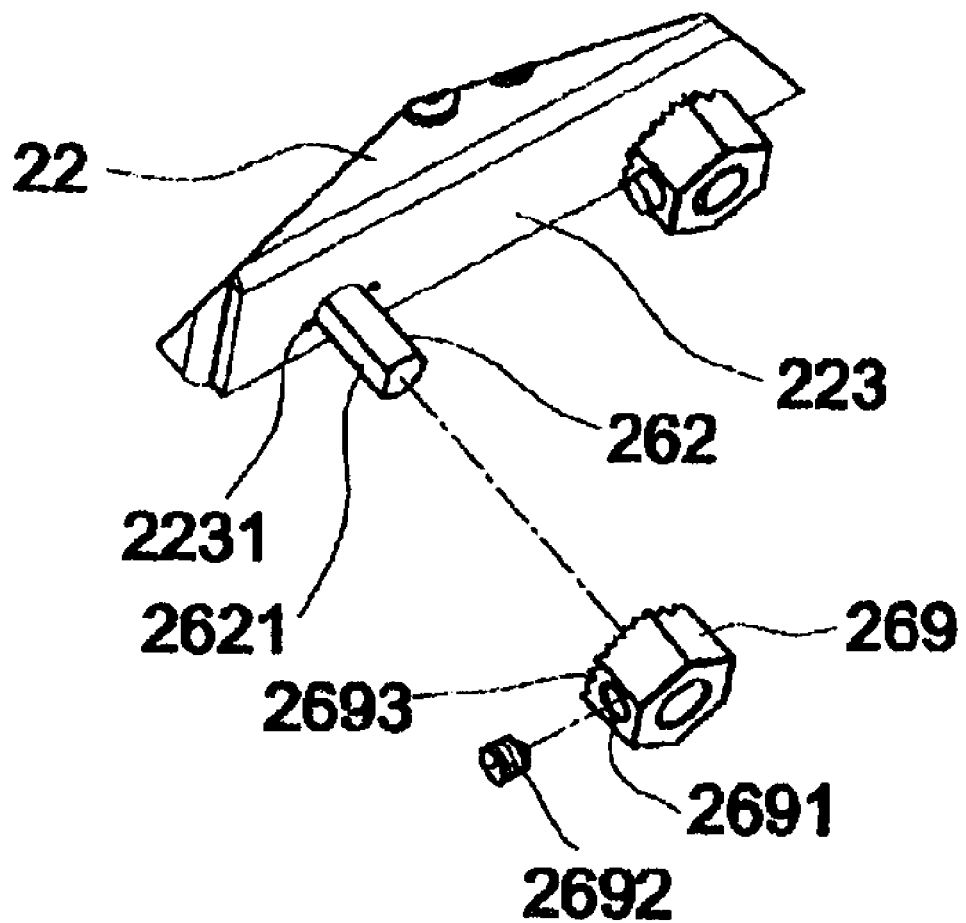
FIG. 5 is an explosive view, showing a non-rotational element of a multi-axial adjustment according to the present invention.

Please refer to FIG. 4. Taking the worm and worm gear set 26B as an example among the worm and worm gear sets 26A, 26B and 26C, it comprises a bolt 261 and an adjusting rod 262. One end of the bolt 261 is fixed on the base seat 21 and another end thereof is screwed with a worm gear 263; the bolt 261 is projected out of the adjusting hole 222 after it is screwed with the worm gear 263. A control piece 264 with a circular groove 2641 around it is disposed at the top end of the worm gear 263. A blocking plate 265 screwed at the bottom of the adjusting hole 222 is used to force the circular groove 2641 to be stuck in the adjusting hole 222 after the bolt 261 is passed through the adjusting hole 222 and a gap is allowed to exist between the groove 2641 and the adjusting hole 222 for the bolt 261 to be rotated freely. Furthermore, the projected end of the bolt 261 is covered with an elastic element 266 whose top is locked with a nut 267 for the elastic element to prop against a upper surface 221 of the adjusting seat 22 and the worm gear 263 is located below the adjusting seat 22. One end of the adjusting rod 262 is pivoted at the side plate 223 of the adjusting seat 22 and another end thereof is fixed with a worm 268 engaged with the worm gear 263. Please refer to FIG. 5. A flat face 2621 covered with a rotation-resistant element 269 is cut at the pivoted end of the adjusting rod 262. A fixing hole 2691 screwed with a fixing element 2692 is passed through at the circumference of the rotation-resistant element 269 such that the adjusting rod 262 and the rotation-resistant element 269 are propped against the flat face 2621 through the fixing element 2692 to form one body. Moreover, radiation type slots are opened on the bottom face of the rotation-resistant element 269 and raised bars 2231 operated in coordination with the slots 2693 are disposed on the side plate 223 of the adjusting seat 22.

When the rotation-resistant element 269 is separated from the locking of the raised bars 2231, the worm 268 is caused to drive the worm gear 263 to move up and down along the bolt 261 by rotating the adjusting rod 262 and in the meantime the control piece 264 is forced to press the adjusting seat 22 to move. The adjusting seat 22 is thrust to lean against the worm gear 263 through the installment of the elastic element 266 after adjusting. Moreover, fixing the position of the adjusting seat 22 can allow the raised bars 2231 to be got stuck in the slots 2693 to prevent the adjusting rod 262 from rotating when an outside vibration is acted after completing the adjustment.

However, each worm and worm gear set has a degree of freedom; therefore, three-axial-direction movement adjustment of the adjusting seat 22 can be provided by controlling the three worm and worm gear sets 26A, 26B and 26C. For example, when the worm and worm gear sets 26A, 26B and 26C are rotated simultaneously, the three control pieces 264 can be caused to move up and down along the bolt 261 and meanwhile the adjusting seat 22 is thrust to yield a Z-axial direction movement. Furthermore, when a part of the worm and worm gear set are fixed, the adjusting seat 22 is caused to take the fixed worm and worm gear set as a revolving spindle to rotate to attain a rotating angle inclination adjustment. For example, rotate the worm and worm gear set 26A and fix the worm and worm gear sets 26B and 26C to cause the control piece 264 to drive the adjusting seat 22 to rotate around Y-axis (e.g. My axial direction); rotate the worm and worm gear set 26C and fix the worm and worm gear sets 26A and 26B to cause the control piece 264 to drive the adjusting seat 22 to rotate around X-axis (e.g. Mx axial direction). The adjustment of three axial directions Z, My and Mx can be provided by collocating the adjusting seat 22 and the three worm and worm gear sets.

Please refer back to FIG. 3. The first sliding seat 23 is installed at an upper surface 221 of the adjusting seat 22 and leaning plates 231 and 232 are respectively projected vertically downward at the front end face and the rear end face thereof. The leaning plates 231 and 232 are respectively attached to the front and the rear end faces of the adjusting seat 22. A plurality of guiding slots 233 and 234 parallel with X-axis direction are respectively disposed in the leaning plates 231 and 232. Moreover, first guiding pillars 235 (e.g. bolts) vertically pass through the guiding slots 233 and 234 and one end of each of them is screwed at the side plate 223 so as to allow the first sliding seat 23 to move relatively to the adjusting seat 22 along the X-axis direction through the cooperative guidance of the first guiding pillars 235 and the guiding slots 233 and 234. A first adjusting element 236 is installed parallel to the X-axis direction, one end thereof is fixed on a leaning plate 224 projected vertically upward at the front right side of the adjusting seat 22 and another end thereof is screwed on a leaning plate 237 projected vertically upward at the front right side of the first sliding seat 23. The first sliding seat 23 is driven to move along the direction of the guiding slot (e.g. X-axis direction) by rotating the first adjusting element 236 to attain the providence of the x-axis directional movement. Furthermore, the first guiding element 235 is locked tight after completing the adjustment so as to fix the first sliding seat 23 to the adjusting seat 22.

Please refer to FIG. 3 again. The rotating seat 24 is installed on the first sliding seat 23 and a plurality of circular arc-guiding slots 241 and a rectangular slot 242 are opened therein. An L-type seat 243 is disposed upon the rectangular slot 242 and a bolt 244 is faced upward and passed through the rectangular slot 242 from below and fixed at the bottom face of the L-type seat 243 such that the bolt 244 can be allowed to slide in the rectangular slot 242. Furthermore, a second guiding pillar 245 is vertically passed through the circular arc-guiding slot 241 and locked on the first sliding seat 23. Besides, one end of a rotation adjusting element 246 is fixed on a fixing plate 2138 projected vertically upward at the front end of the first sliding seat 23 and another end thereof is screwed a vertical face 2431 of the L-type seat 243. The L-type seat is driven to move by rotating the rotation adjusting element 246 and meanwhile the side edge of the rectangular slot 242 is pushed by the bolt 244 below the L-type seat 243 and the cooperative guidance of the circular arc-guiding slot 241 and the second guiding pillar 245 is collocated to drive the rotating seat 24 to rotate around Z-axis. Finally, the second guiding pillar 245 is locked after completing the adjustment so as to fix the rotating seat 24 to the first sliding seat 23.

The second sliding seat 25 is installed on the rotating seat 24 and a plurality of guiding slots 251 parallel to the Y-axis direction are opened therein, a third guiding pillar 252 vertically passes through each guiding slot 251 from above and is then locked to the rotating seat 24 such that the second sliding seat 25 can be moved relatively to the rotating seat 24 along the Y-axis direction. Moreover, a second adjusting element 253 is installed parallel to the Y-axis direction, one end thereof is fixed on the side plate 247 projected vertically upward at the front end of the rotating seat 24 and another end thereof is screwed on a side plate 254 projected vertically upward at the front end of the second sliding seat 25. The second sliding seat 25 is driven to move along the direction of the sliding slot 251 (e.g. Y-axis direction) by rotating the second adjusting element 253 to attain the providence of the Y-axis directional movement. Finally, the third guiding pillar 252 is locked after completing the adjustment so as to fix the second sliding seat 25 to the rotating seat 24. Besides, a U-type holding bracket 255 is fixed at the upper side of the second sliding seat 25 for fixing an optical engine.

Therefore, after an optical engine (not shown in the figure) is fixed on the holding bracket 255, the X-axis, Y-axis and Z-axis directions and the Mx, My and Mz rotating angles of the optical engine are quickly adjusted so as to allow the image beams emitted from the optical engine capable of being projected onto a screen accurately by respectively rotating the adjusting rod 262, the first adjusting element 236, the rotation adjusting element 246 and the second adjusting element 253.

Moreover, a plurality of worm and worm gear sets installed at a same plane are used to provide a multi-axis adjustment to replace a part of the layers-stacking type structure and the worm and worm gear structure is perpendicularly disposed so that the volume shrinkage of a apparatus can be attained.

That the adjusting rods are centralized properly according to the present invention, i.e. that the adjusting rods 262 of the worm and worm gear sets 26A, 26B and 26C are installed at the front end face of the adjusting seat 22, the first adjusting element 236 is installed at the right front end face and the rotation adjusting element 246 and the second adjusting element 253 are respectively installed at the front faces of the first sliding seat 23 and the rotating seat 24 can be convenient in processing the adjustment work to reduce the adjustment time comparing to the prior art that installs adjusting elements dispersedly. Besides, an opening can be disposed below a screen and end faces with the adjusting rod are faced to the opening so as to allow the adjustment work to be processed conveniently through the opening after the adjustment apparatus is assembled in a projection system.

The adjusting seat 22 can be allowed to have a high stabilization after adjusting by utilizing the engagement characteristic of a worm and a worm gear and installment of rotation-resistant elements and elastic elements. In addition, the first sliding seat 23, the rotating seat 24 and the second sliding seat 25 are directly or indirectly combined with the adjusting seat 22 into one body such that the multi-axis adjusting apparatus can be allowed to have even better stabilization.

It is noted that the multi-axis adjusting apparatus described above is the preferred embodiment of the present invention for the purpose of illustration only, and are not intended as a definition of the limits and scope of the invention disclosed. Any modifications and variations that may be apparent to a person skilled in the art are intended to be included within the scope of the present invention.

What is claimed is:

1. A multi-axis adjusting apparatus, comprising:

a base seat;

an adjusting seat, installed upon said base seat; and a plurality of worm and worm gear sets, installed between said adjusting seat and said base seat, each worm and worm gear set comprising an adjusting rod and a bolt, said adjusting rod being pivoted at said adjusting seat, a worm being installed at one end thereof and a worm gear engaged with said worm being screwed on said bolt, a control piece being installed at the top end of said worm gear used to thrust said adjusting seat, one end of said bolt being fixed at said base seat.

2. The apparatus according to claim 1, wherein another end of said bolt is projected through said adjusting seat, said projected end is covered with an elastic element and locked with a nut, and said elastic element is propped against said adjusting seat.

3. The apparatus according to claim 1, wherein a rotation-resistant element is installed at one end of said adjusting rod.

4. The apparatus according to claim 1, wherein said adjusting rods are installed on a same end face.

5. The apparatus according to claim 1, wherein at least one sliding seat is installed on said adjusting seat, guiding slots and guiding pillars are disposed on said sliding seat, and an adjusting element is screwed at on side of said sliding seat.

6. The apparatus according to claim 5, wherein said adjusting elements and said adjusting rods are installed on a same end face.

7. The apparatus according to claim 1, wherein at least one rotating seat is installed on said adjusting seat, circular arc-guiding slots passed through each with a guiding pillar are installed on said rotating seat, and adjusting elements are screwed at one side of said rotating seat.

8. The apparatus according to claim 7, wherein said adjusting elements and said adjusting rods are on a same end face.

* * * * *